United States Patent
Burns et al.

(10) Patent No.: US 7,502,327 B2
(45) Date of Patent: Mar. 10, 2009

(54) METHOD AND SYSTEM FOR TESTING NETWORK CONNECTIONS

(75) Inventors: David J Burns, Ottawa (CA); Norman J Robertson, Kanata (CA); Frank Tony Gorenc, Burlington (CA); Manuel Lopes Branco, Mississauga (CA)

(73) Assignee: IXIA, Calabasas, CA (US)

( * ) Notice: Subject to any disclaimer, the term of this patent is extended or adjusted under 35 U.S.C. 154(b) by 817 days.

(21) Appl. No.: 11/002,122

(22) Filed: Dec. 3, 2004

(65) Prior Publication Data

US 2006/0067237 A1   Mar. 30, 2006

Related U.S. Application Data

(63) Continuation of application No. PCT/CA2004/001739, filed on Sep. 24, 2004.

(51) Int. Cl.
*H04J 3/14* (2006.01)
*H04L 12/26* (2006.01)

(52) U.S. Cl. ............................ 370/241; 379/9
(58) Field of Classification Search ............. 370/241, 370/252, 401; 714/1, 100; 379/9
See application file for complete search history.

(56) References Cited

U.S. PATENT DOCUMENTS

| | | | |
|---|---|---|---|
| 5,619,489 | A | 4/1997 | Chang et al. |
| 5,796,953 | A | 8/1998 | Zey |
| 5,835,565 | A | 11/1998 | Smith et al. |
| 5,835,566 | A | 11/1998 | Cowgill |
| 5,838,919 | A | 11/1998 | Schwaller et al. |
| 5,933,475 | A | 8/1999 | Coleman |
| 5,982,852 | A | 11/1999 | Schwartz |
| 6,031,528 | A | 2/2000 | Langfahl, Jr. |
| 6,212,258 | B1 | 4/2001 | Bella et al. |
| 6,278,769 | B1 | 8/2001 | Bella |

(Continued)

FOREIGN PATENT DOCUMENTS

CA   2338682 A1   12/2000

(Continued)

OTHER PUBLICATIONS

Documentation from http://www.ando.co.jp—website for Ando Electric Co., Ltd.: (i) home page; (ii) Products Info; (iii) Measuring Instruments; and (iv) xDSL loop Tester,LX100.

*Primary Examiner*—Kevin C Harper
(74) *Attorney, Agent, or Firm*—SoCal IP Law Group LLP; Steven C. Sereboff; John E. Gunther

(57) ABSTRACT

A novel method and system for testing network connections is provided. In an embodiment, the system includes a network, such as the Internet, which is connected to subscriber devices in a subscriber site via an service provider, a gateway in a telephone company central office, and a DSLAM in an open plant interface. The system also includes a test apparatus operable to inject itself in the connection between the subscriber devices and the Internet at the gateway. The test apparatus can mimic the service provider and, thereby connect directly with the device at the subscriber site and try to test network connections for issue between the service provider and the device. The test apparatus can also mimic the customer and, thereby connect directly with the device and the test network connections between the service provider and the device.

79 Claims, 9 Drawing Sheets

U.S. PATENT DOCUMENTS

| | | | |
|---|---|---|---|
| 6,397,359 B1 | 5/2002 | Chandra et al. | |
| 6,414,958 B1 | 7/2002 | Specht | |
| 6,434,221 B1 | 8/2002 | Chong | |
| 6,473,798 B1 | 10/2002 | Grosser, Jr. et al. | |
| 6,477,238 B1 | 11/2002 | Schneider et al. | |
| 6,510,463 B1 | 1/2003 | Farhat et al. | |
| 6,574,309 B1 | 6/2003 | Chea, Jr. et al. | |
| 6,580,727 B1 | 6/2003 | Yim et al. | |
| 6,584,148 B1 * | 6/2003 | Zitting et al. | 375/222 |
| 6,594,343 B1 | 7/2003 | Duffie et al. | |
| 6,687,335 B1 | 2/2004 | Jones et al. | |
| 7,068,758 B1 * | 6/2006 | Wallace et al. | 379/29.05 |
| 7,185,045 B2 | 2/2007 | Ellis et al. | |
| 7,349,345 B1 | 3/2008 | Hansen et al. | |
| 2003/0083842 A1 | 5/2003 | Miller et al. | |
| 2003/0188003 A1 | 10/2003 | Sylvest et al. | |
| 2003/0204611 A1 | 10/2003 | McCosh et al. | |
| 2003/0218984 A1 | 11/2003 | Tanaka | |
| 2003/0223375 A1 * | 12/2003 | Govreen-Segal | 370/248 |
| 2004/0010627 A1 | 1/2004 | Ellis et al. | |
| 2005/0015644 A1 | 1/2005 | Chu et al. | |
| 2005/0025189 A1 | 2/2005 | Smith | |
| 2006/0227706 A1 * | 10/2006 | Burst, Jr. | 370/229 |
| 2006/0242289 A1 * | 10/2006 | Miller et al. | 709/223 |
| 2007/0121792 A1 * | 5/2007 | Chong | 379/1.01 |
| 2008/0232576 A1 * | 9/2008 | Bake et al. | 379/313 |

FOREIGN PATENT DOCUMENTS

| | | |
|---|---|---|
| CA | 2448909 A1 | 12/2002 |
| CA | 2359991 A1 | 3/2003 |
| JP | 2000332755 | 11/2000 |
| WO | WO 02/14977 | 2/2002 |
| WO | WO 02/14977 A2 | 2/2002 |
| WO | WO 02/17571 | 2/2002 |
| WO | WO 02/17571 A1 | 2/2002 |
| WO | WO 02/056541 A2 | 7/2002 |
| WO | WO 02/056541 A3 | 7/2002 |
| WO | WO 2004/066601 A1 | 8/2004 |
| WO | WO 2005/032047 A1 | 4/2005 |
| WO | PCT/CA2005/001931 | 12/2005 |

* cited by examiner

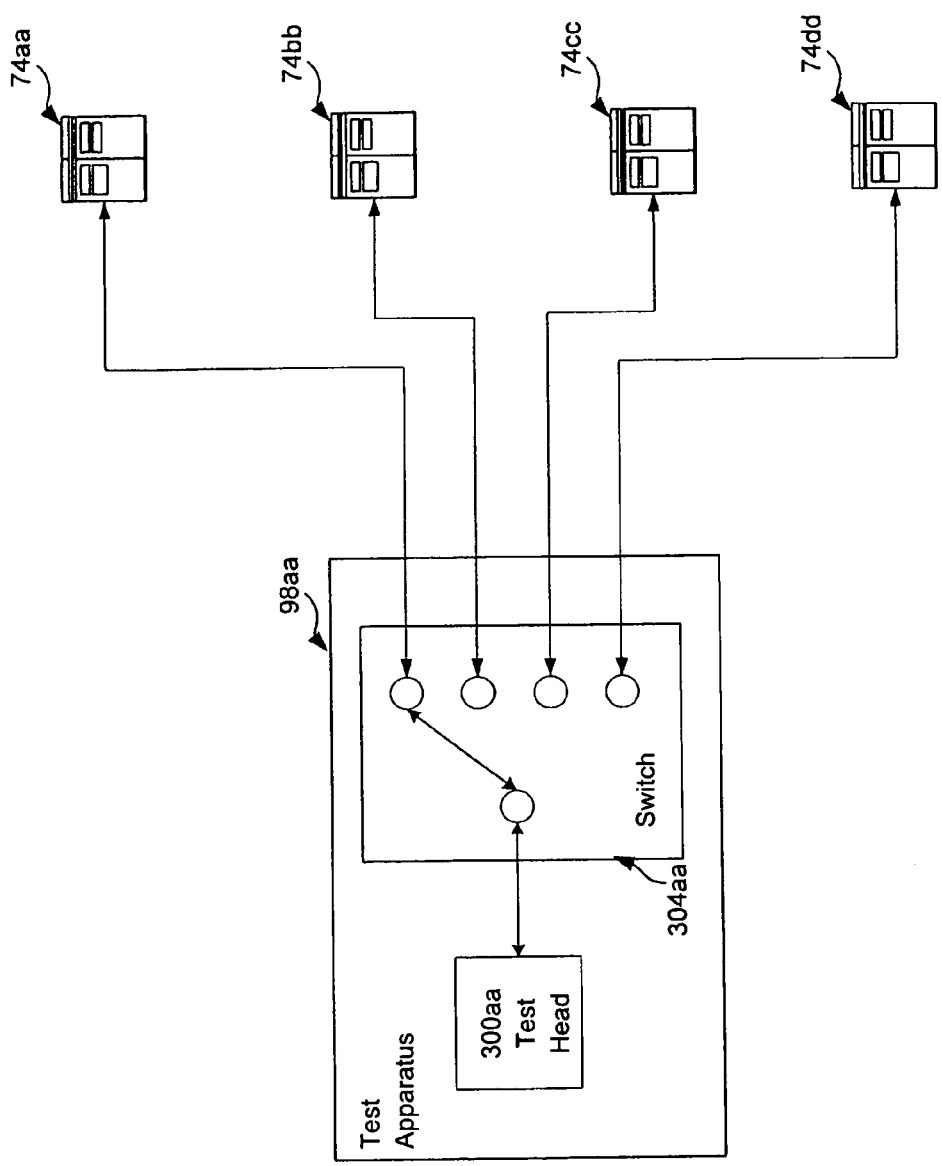

METHOD AND SYSTEM FOR TESTING NETWORK CONNECTIONS

FIELD OF THE INVENTION

The present invention relates generally to telecommunications and more particularly to a method and system for testing network connections.

BACKGROUND OF THE INVENTION

Telecommunications has advanced such that there is now a vast array of services and technologies available to consumers. As services become more sophisticated, and competition more widespread, there is a natural pressure to reduce costs and improve efficiencies in the administration of a telecommunication network.

Significant costs in network administration arise any time there is a need for a so-called "truck roll", as a service technician is dispatched to find and repair a fault in the network. As a more specific example, in wired telephone networks based on traditional copper twisted-pair, very often a problem will require the dispatching of a service technician to physically attend at the central office that services the customer, and/or the customer sites, and/or a variety of locations in between in order to find and repair the fault. Where the distance between the central office and the customer is great, the costs are often higher.

Additionally, such expenses for truck rolls are becoming more acute as voice, video, internet and other services are added to traditional copper twisted pair networks. Such truck rolls can mean an unacceptably long mean time to repair, low employee productivity, a greater number of repeat calls, and an overall strain on meeting service level agreements. It is therefore desirable to have ways to test network connections over twisted pair networks and the like that reduce the reliance on technicians to be dispatched to specifically identify and repair network connections problems. Still further problems with prior art testing of network connections include a lack of ability to remotely test at the application layer and/or certain other layers above the physical layer of a given connection.

SUMMARY OF THE INVENTION

It is an object of the present invention to provide a novel method and system for testing network connections that obviates or mitigates at least one of the above-identified disadvantages of the prior art.

According to an aspect of the invention there is provided a test apparatus for testing network connections comprising a first interface for connecting to a node situated along a pathway between a data network and a subscriber device; a second interface for connecting to a computing apparatus; and a test head intermediate said interfaces and operable to generate at least one network connection test over at least a portion of said pathway, said test head further operable to generate said at least one connection test based on instruction received from said computing apparatus via said second interface, said test head further operable to generate output representing results of said at least one network connection test.

In a particular implementation of the first aspect, the first interface includes a switch operable to remotely connect said first interface to at least one of a plurality of nodes.

In a particular implementation of the first aspect, the switch is operable to connect said first interface to a plurality of said nodes substantially simultaneously and wherein said test head is operable to generate a connection test for each pathway respective to each said node such that said test apparatus is operable to perform a plurality of said connection tests substantially simultaneously.

In a particular implementation of the first aspect, the subscriber device is a computer and said network is the Internet and communications therebetween include at least one of web-browsing and email.

In a particular implementation of the first aspect, the at least one network connection test includes at least one of an ICMP "ping", a test for constant bit rate, a test for time delay, a test including the introduction of jitter, noise, bad or defective packets, a cyclic redundancy check, and a test including packet loss.

In a particular implementation of the first aspect, the subscriber device is a VOIP telephone and said network is the Internet and communications there between include a VOIP telephone call.

In a particular implementation of the first aspect, the at least one network connection test includes at least one of a test for constant bit rate, a test for time delay, a test including the introduction of jitter, noise, bad or defective packets, a cyclic redundancy check and a test including packet loss.

In a particular implementation of the first aspect, the test apparatus further includes a local clock resident at said test apparatus for communicating with a remote tester resident on said network, said remote tester including another clock, said at least one network connection test including a test for delay wherein at least one VOIP packet is sent from said test apparatus to said remote tester at an originating time according said local clock, and said remote tester returns an arrival time according to said another clock when said at least one VOIP packet arrived at said remote tester such that a comparison can be effected between said times.

In a particular implementation of the first aspect, the local clock is based on a GPS clock.

In a particular implementation of the first aspect, the test head is at a remote location from said computing apparatus.

In a particular implementation of the first aspect, the communications with said computing apparatus via said second interface are conducted over a proprietary secure network of a service provider operating said computing apparatus.

In a particular implementation of the first aspect, the test head connects to said node based on an additional instruction from said computing apparatus received at at least one of said test head and said node; said additional instruction for disconnecting said subscriber device from said node such that said at least a portion of said pathway is between said node and said data network.

In a particular implementation of the first aspect, the test head connects to said node based on an additional instruction from said computing apparatus received at at least one of said test head and said node; said additional instruction for disconnecting said network from said node such that said at least a portion of said pathway is between said node and said subscriber device.

In a particular implementation of the first aspect, the first interface includes a switch operable to remotely connect said first interface to at least one of a plurality of nodes and wherein said instruction includes a command to actuate said switch.

In a particular implementation of the first aspect, the network connection test is initiated by user input entered into a web page presented on said subscriber device and for issuing instructions to said test head.

In a particular implementation of the first aspect, the output is delivered to said computing apparatus via said second interface.

According to a second aspect of the invention, there is provided a test apparatus for testing network connections comprising: a first interface for connecting to a node situated along a pathway between the Internet and a subscriber device; a second interface for connecting to a remote computing apparatus; and a test head between said interfaces and operable to generate at least one network connection test over at least a portion of said pathway, said test head further operable to generate said at least one connection test based on instructions received from said computing apparatus via said second interface, said test head further operable to return results of said at least one network connection test to said computing apparatus via said second interface.

In a particular implementation of the second aspect, the node is a DSLAM for intermediating communications between said Internet and said device and wherein said pathway based on DSL.

In a particular implementation of the second aspect, the test head connects to said node based on an additional instruction from said computing apparatus received at at least one of said test head and said node; said additional instruction for disconnecting said subscriber device from said node such that said at least a portion of said pathway is between said node and said data network.

In a particular implementation of the second aspect, the test head connects to said node based on an additional instruction from said computing apparatus received at at least one of said test head and said node; said additional instruction for disconnecting said network from said node such that said at least a portion of said pathway is between said node and said subscriber device.

In a particular implementation of the second aspect, the communications with said computing apparatus via said second interface are conducted over at least a portion of a secure network proprietary to a service provider operating said computing apparatus.

In a particular implementation of the second aspect, the first interface includes a switch operable to remotely connect said first interface to at least one of a plurality of nodes and wherein said instruction includes a command to actuate said switch.

In a particular implementation of the second aspect, the network connection test is initiated by user input entered into a web page presented on said subscriber device and for issuing instructions to said test head.

According to a third aspect of the invention, there is provided a computing apparatus comprising an interface for remote connection to a test apparatus, said apparatus operable to cause introduction of said test apparatus to a node situated along a pathway between a data network and a subscriber device, said computing apparatus further operable to remotely instruct said test apparatus to perform at least one network connection test over at least a portion of said pathway, said computing apparatus further operable to receive results of said at least one network connection test that are generated by said test apparatus.

In a particular implementation of the third aspect, the introduction includes an instruction to disconnect said subscriber device from said node such that said portion of said pathway comprises a path between said node and said data network.

In a particular implementation of the third aspect, the node is a gateway having at least one PVC and said instruction is addressed to said PVC.

In a particular implementation of the third aspect, the introduction includes an instruction to disconnect said data network from said node such that said portion of said pathway comprises a path between said node and said subscriber device.

In a particular implementation of the third aspect, the node is a gateway having at least one PVC and said instruction is addressed to said PVC.

In a particular implementation of the third aspect, the computing apparatus is implemented in a distributed manner across a first computing device that is remote from a second computing device.

In a particular implementation of the third aspect, the pathway is based on DSL and said connection test based on DSL standards.

In a particular implementation of the third aspect, the subscriber device is a computer and said network is the Internet and communications therebetween include at least one of web-browsing and email.

In a particular implementation of the third aspect, the at least one network connection test includes at least one of an ICMP "ping", a test for constant bit rate, a test for time delay, a test including the introduction of jitter, noise, bad or defective packets, a cyclic redundancy check, and a test including packet loss.

In a particular implementation of the third aspect, the subscriber device is a VOIP telephone and said network is the Internet and communications therebetween include a VOIP telephone call.

In a particular implementation of the third aspect, the apparatus is accessible to a plurality of customer service workstations from which said apparatus can be operated.

In a particular implementation of the third aspect, the test apparatus is at a remote location from said computing apparatus.

In a particular implementation of the third aspect, the communications with said test apparatus are conducted over at least a portion of a secure network proprietary to a service provider operating said computing apparatus.

In a particular implementation of the third aspect, the test apparatus includes a switch operable to remotely connect said first interface to at least one of a plurality of nodes and wherein said introduction includes an instruction to actuate said switch.

According to a fourth aspect of the invention, there is provided a computer readable media storing a plurality of programming instructions for execution on a computing apparatus that is remotely connectable to a test apparatus, said instructions for rendering said computing apparatus operable to cause introduction of said test apparatus to a node situated along a pathway between a data network and a subscriber device, said instructions further rendering said computing apparatus operable to issue remote instructions to said test apparatus to perform at least one network connection test over at least a portion of said pathway, said instructions further rendering said computing apparatus operable to receive results of said at least one network connection test that are generated by said test apparatus.

According to a fifth aspect of the invention, there is provided a computer readable media storing a plurality of programming instructions for execution on a computer-based test apparatus for testing network connections that is connectable to a computing apparatus via an interface; said instructions for rendering said test apparatus connectable to a node situated along a pathway between a data network and a subscriber device via remote instructions received by said test apparatus; said programming instructions rendering said test apparatus operable to generate at least one network connection test over at least a portion of said pathway; said programming instructions further rendering said test apparatus operable to generate said at least one connection test based on instructions received from said computing apparatus; said programming instructions rendering said test apparatus further operable to return results of said at least one network connection test to said computing apparatus.

According to a sixth aspect of the invention, there is provided a system for testing network connections comprising: a node for connection to a data network; a subscriber device connected to said node and for communicating with said data network via said node; a test apparatus remotely connectable to said node and for performing at least one network connection test along at least a portion of a pathway between said node and said data network or said node and said subscriber device; and a computing apparatus connected to said test apparatus and said node for instructing said test apparatus to perform said test and for receiving results thereof from said test apparatus.

In a particular implementation of the sixth aspect, the network connection test is initiated by user input entered into a web page presented on said subscriber device and for issuing instructions to said test head.

In a particular implementation of the sixth aspect, the test apparatus is at a remote location from said computing apparatus.

In a particular implementation of the sixth aspect, the communications between said computing apparatus and said test apparatus are conducted over at least a portion of a secure network proprietary to a service provider operating said computing apparatus.

In a particular implementation of the sixth aspect, the test apparatus includes a switch operable to remotely connect said first interface to at least one of a plurality of nodes and wherein said instructing includes a command to actuate said switch.

In a particular implementation of the sixth aspect, the test apparatus is connectable to said node via a command from said computing apparatus, said command including an instruction to said node to disconnect said subscriber device from said node such that said portion of said pathway comprises a path between said node and said data network.

In a particular implementation of the sixth aspect, the node is a gateway having at least one PVC and said instruction is addressed to said PVC.

In a particular implementation of the sixth aspect, the test apparatus is connectable to said node via a command from said computing apparatus, said command including an instruction to disconnect said data network from said node such that said portion of said pathway comprises a path between said node and said subscriber device.

In a particular implementation of the sixth aspect, the node is a gateway having at least one PVC and said instruction is addressed to said PVC.

In a particular implementation of the sixth aspect, the test apparatus and said computing apparatus are integrated into a single apparatus.

In a particular implementation of the sixth aspect, the system for testing network connections further comprises a plurality of workstations connected to said computing apparatus for issuing instructions thereto.

In a particular implementation of the sixth aspect, the node is a gateway for intermediating communications between said network and said subscriber device.

In a particular implementation of the sixth aspect, the gateway is a DSL access concentrator and further comprising an outside plant interface intermediate said node and said subscriber device, said outside plant interface housing a DSLAM for intermediating communications between said DSL access concentrator and said subscriber device In a particular implementation of the sixth aspect, the gateway includes a plurality of permanent virtual circuits that are switchable according to instructions received from said computing apparatus, wherein a connection between said gateway and said data network is effected via a first permanent virtual circuit at said gateway, wherein a connection between said gateway and said subscriber device is effected via a second permanent virtual circuit at said gateway, wherein said communications between said subscriber device and said network are effected when said first permanent virtual circuit is connected to said second permanent virtual circuit, and wherein introduction of said test apparatus to said gateway includes an instruction from said computing apparatus to disconnect said first permanent virtual circuit from said second permanent virtual circuit and to connect said first permanent virtual circuit with a permanent virtual circuit at said gateway that is connected to said test apparatus.

In a particular implementation of the sixth aspect, the gateway includes a plurality of permanent virtual circuits that are switchable according to instructions received from said computing apparatus, wherein a connection between said gateway and said data network is effected via a first permanent virtual circuit at said gateway, wherein a connection between said gateway and said subscriber device is effected via a second permanent virtual circuit at said gateway, wherein said communications between said subscriber device and said network are effected when said first permanent virtual circuit is connected to said second permanent virtual circuit, and wherein introduction of said test apparatus to said gateway includes an instruction from said computing apparatus to disconnect said first permanent virtual circuit from said second permanent virtual circuit and to connect said second permanent virtual circuit with a permanent virtual circuit at said gateway that is connected to said test apparatus.

In a particular implementation of the sixth aspect, the subscriber device is a computer and said network is the Internet and communications therebetween include at least one of web-browsing and email.

In a particular implementation of the sixth aspect, the at least one network connection test include at least one of an ICMP "ping", a test for constant bit rate, a test for time delay, a test including the introduction of jitter, noise, bad or defective packets, a cyclic redundancy check, and a test including packet loss.

In a particular implementation of the sixth aspect, the subscriber device is a VOIP telephone and said network is the Internet and communications therebetween include a VOIP telephone call.

In a particular implementation of the sixth aspect, the at least one network connection test include at least one of a test for constant bit rate, a test for time delay, a test including the introduction of jitter, noise, bad or defective packets, a cyclic redundancy check, and a test including packet loss.

In a particular implementation of the sixth aspect, the system further includes a local clock resident at said test apparatus and a remote tester resident on said network, said remote tester including another clock, said at least one network connection test including a test for delay wherein at least one VOIP packet is sent from said test apparatus to said remote tester at an originating time according said local clock, and said remote tester returns an arrival time according to said another clock when said at least one VOIP packet arrived at said remote tester such that a comparison can be effected between said times.

In a particular implementation of the sixth aspect, the clocks are based on GPS devices.

In a particular implementation of the sixth aspect, the test apparatus is operable to perform at least one network connection test along both a pathway between said node and said subscriber device and a pathway between said node and said data network.

In a particular implementation of the sixth aspect, the test apparatus is further operable to respond to at least one additional network connection test generated by said subscriber device and report the results of said at least one additional network connection test back to said subscriber device.

In a particular implementation of the sixth aspect, the network connection test is initiated by user input entered into a web page presented on said subscriber device and for issuing instructions to said test head.

According to a seventh aspect of the invention, there is provided a method for testing a network connection comprising the steps of: receiving a remote instruction to perform at least one network connection test over at least a portion of a pathway between a data network and a subscriber device having a node therebetween; based on said instruction, generating said at least one network connection test over said at least a portion of said pathway; and outputting results of said at least one network connection test.

In a particular implementation of the seventh aspect, the node is a gateway for intermediating communications between said network and said subscriber device.

In a particular implementation of the seventh aspect, the pathway is based on DSL and wherein said gateway is a DSL access concentrator and wherein said pathway further comprises an outside plant interface intermediate said node and said subscriber subscriber device, said outside plant interface housing a DSLAM for intermediating communications between said DSL access concentrator and said subscriber device.

In a particular implementation of the seventh aspect, the subscriber device is a computer and said network is the Internet and communications therebetween include at least one of web-browsing and email.

In a particular implementation of the seventh aspect, the at least one network connection test includes at least one of an ICMP "ping", a test for constant bit rate, a test for time delay, a test including the introduction of jitter, noise, bad or defective packets, a cyclic redundancy check, and a test including packet loss.

In a particular implementation of the seventh aspect, the subscriber device is a VOIP telephone and said network is the Internet and communications therebetween include a VOIP telephone call.

In a particular implementation of the seventh aspect, the at least one network connection test includes at least one of a test for constant bit rate, a test for time delay, a test including the introduction of jitter, noise, bad or defective packets, a cyclic redundancy check a, a tests involving packet loss.

According to an eighth aspect of the invention, there is provided a method for testing a connection comprising the steps of: issuing a first instruction to cause introduction of a test apparatus to a node situated along a pathway between a data network and a subscriber device; issuing a second instruction to said test apparatus to perform at least one network connection test over at least a portion of said pathway; and receiving results of said at least one network connection test that are generated by said test apparatus.

In a particular implementation of the eighth aspect, the first instruction includes disconnecting said subscriber device from said node such that said portion of said pathway comprises a path between said node and said data network.

In a particular implementation of the eighth aspect, the first instruction includes an instruction to disconnect said data network from said node such that said portion of said pathway comprises a path between said node and said subscriber device.

BRIEF DESCRIPTION OF THE DRAWINGS

The invention will now be described by way of example only, and with reference to the accompanying drawings, in which.

DETAILED DESCRIPTION OF THE INVENTION

Figure 1:
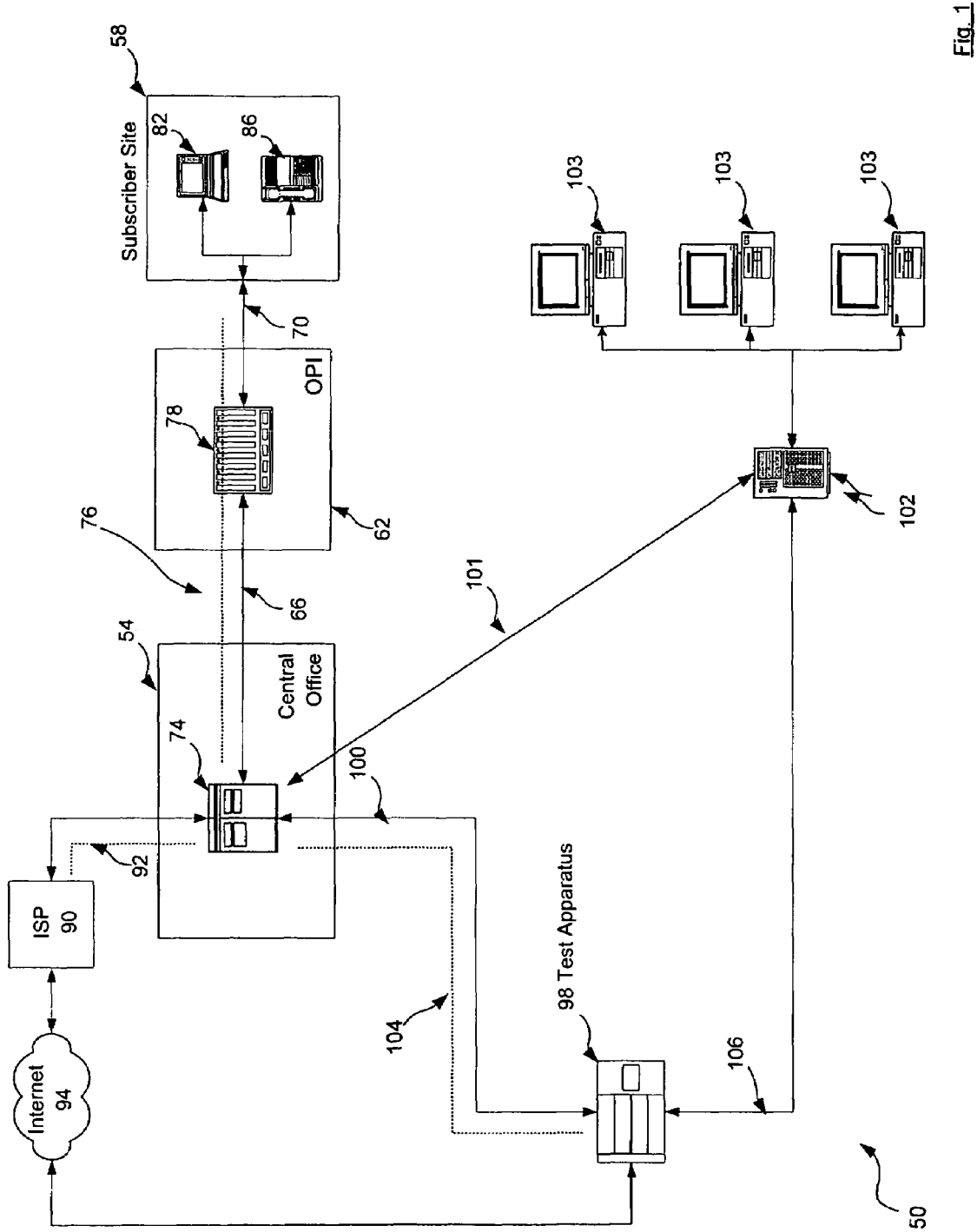
FIG. 1 is a schematic representation of a system for testing network connections in accordance with an embodiment of the invention.

Referring now to FIG. 1, a system for testing network connections is indicated generally at 50. In a present embodiment, system 50 is based on the plain old telephone system ("POTS") having digital subscriber line ("DSL") capabilities. System 50 thus comprises a central office 54 that connects to a plurality of subscriber sites 58 via a plurality of outside plant interfaces 62 ("OPI"). More specifically, central office 54 connects to OPI 62 via a fibre-to-the-node ("FTTN") link 66, while OPI 62 connects to each subscriber site 58 via a copper twisted pair link 70.

For simplicity sake, FIG. 1 only shows one OPI 62 connected to a single subscriber site 58, but those of skill in the art will appreciate that a single central office 54 can typically serve several OPIs 62, and in turn each OPI 62 will serve several subscriber sites 58. Furthermore, while system 50 is based on the POTS system, FIG. 1 does not illustrate legacy public switched telephone network ("PSTN") components but focuses on the DSL features found in system 50, and it is to be emphasized that while such legacy PSTN components can be included in system 50, they are not necessary.

Central office 54 includes a data network gateway 74, which in a present embodiment is a Stinger® FS+ DSL Access Concentrator ("Stinger®") from Lucent Technologies, 600 Mountain Ave., Murray Hill, N.J. 07974-0636 USA, but other gateways can be used. OPI 62 includes a digital subscriber line access module ("DSLAM") 78, and in a present embodiment the DSLAM is a Stinger® Compact Remote from Lucent Technologies, 600 Mountain Ave, Murray Hill, N.J. 07974-0636, but other DSLAMs can be used. Together, gateway 74 and DSLAM 78 cooperate to provide data services to subscriber site 58. Thus, each subscriber site 58 in turn includes a plurality of subscriber devices that make use of the services made available by gateway 74 and DSLAM 78. In a present embodiment, these devices include a computing device 82 and a voice over internet protocol ("VOIP") telephony device 86. While not included in system 50, it is to be understood that other subscriber devices can also be provided depending on the types of data services being offered to subscribers, such as video. It is also to be understood that, while the present embodiment uses both a Stinger and a DSLAM, it should be understood that these are effectively a DSLAM implemented at two levels and other implementations, involving only a single DSLAM, are within the scope of the invention.

In a present embodiment, gateway 74 is connected to an internet service provider ("ISP") 90, which in turn connects gateway 74 to a data network, which in a present embodiment is the Internet 94.

As will be understood by those of skill in the art, when gateway 74 is implemented using a Stinger®, then gateway 74 can include a plurality of permanent virtual circuits ("PVC") that run over the physical connections between gateway 74 and the other components in system 50. Such PVCs render gateway 74 operable to allow a subscriber site to connect to a plurality of different data service providers (i.e. other than ISP 90), thereby allowing a subscriber to choose the service provider from which they obtain their data services. In a present embodiment, ISP 90 is the same entity that owns and/or operates central office 54 and OPI 62, however, in other embodiments these elements can be owned and/or operated by different entities.

Figure 2:
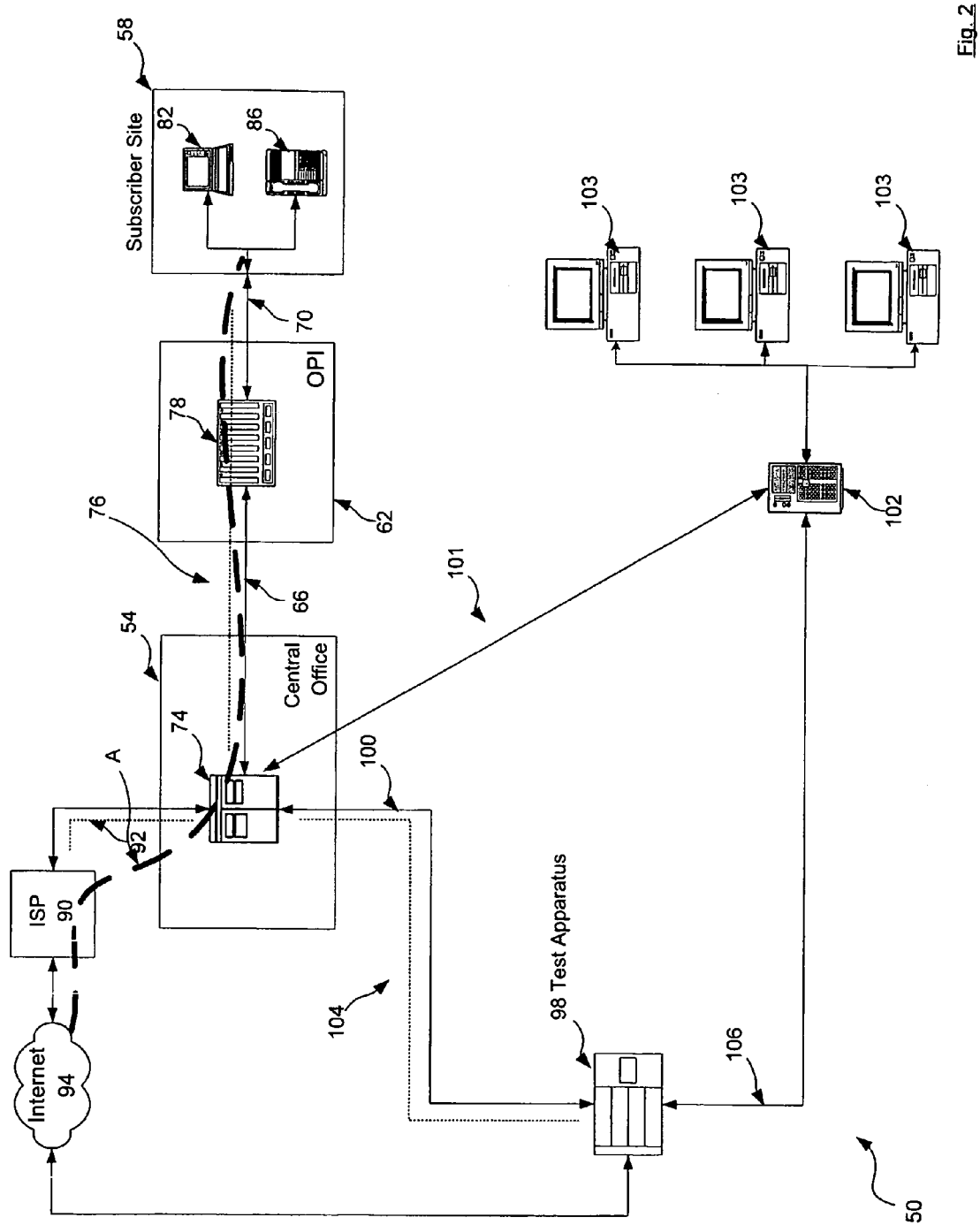
FIG. 2 shows the system of FIG. 1 operating in standard mode.

The PVC between gateway 74 and ISP 90 is represented by the dotted line indicated at 92. The PVC between gateway 74 and subscriber site 58 is represented by the dotted line indicated at 76. Referring now to FIG. 2, when operating in a standard mode, Internet 94 is connected to subscriber site 58 along the path indicated at A via PVC 76 and PVC 92. Put in other words, when system 50 is in standard mode, PVC 76 and PVC 92 are connected by gateway 74.

Figure 3:
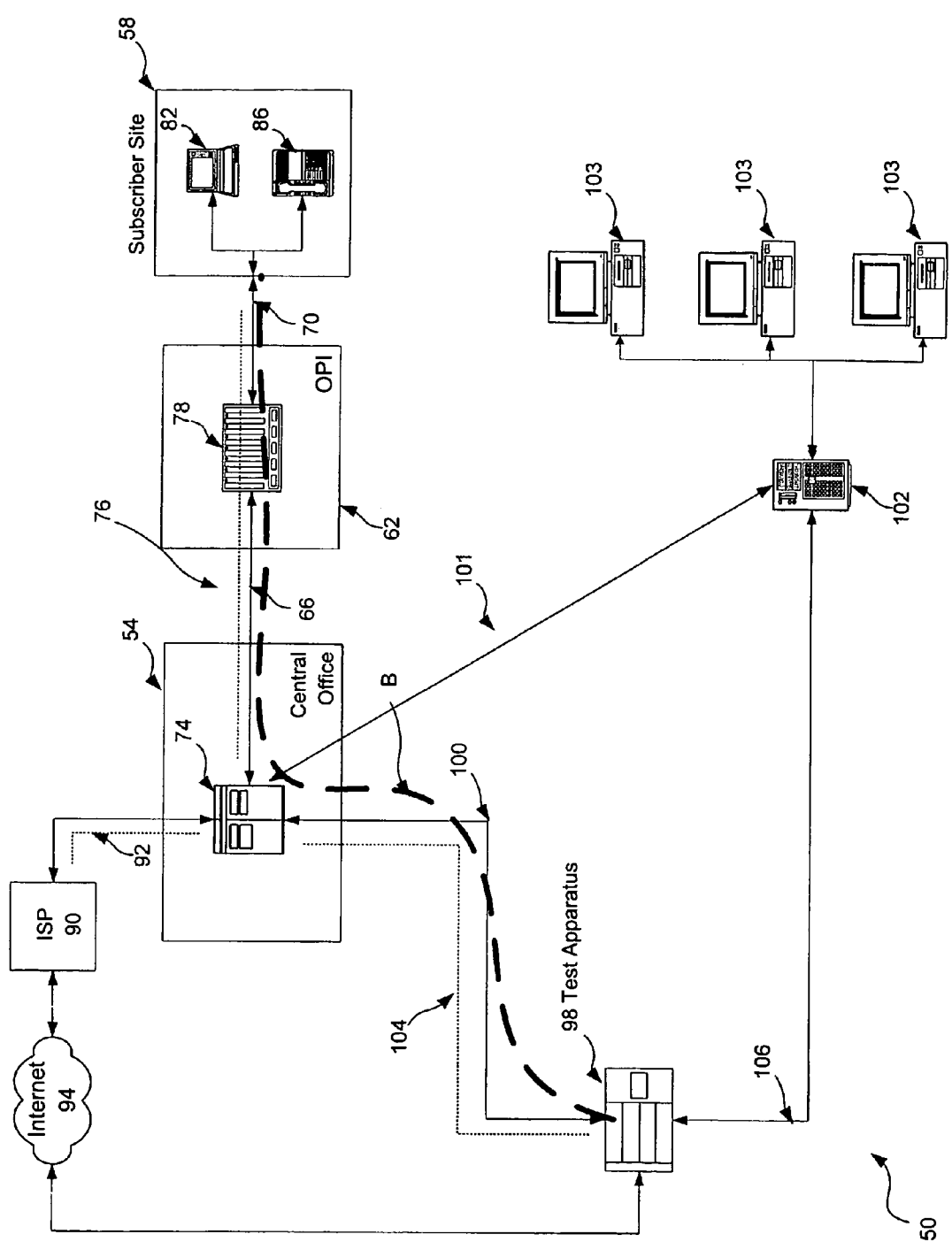
FIG. 3 shows the system of FIG. 1 operating in a subscriber test mode.

Gateway 74 in central office 54 is also connected to a test apparatus 98. The PVC between test apparatus 78 and central office 54 is represented by the dotted line indicated at 104. In a present embodiment, the PVCs in gateway 74 are remotely switchable, via instructions received over an internal network 101, in order to change the connections in gateway 74 between:

(a) he standard mode shown in FIG. 2;
(b) subscriber test mode, wherein test apparatus 98 is connected to subscriber site 58, such that PVC 104 is connected to PVC 76, as shown in FIG. 3, and;
(c) an Internet test mode wherein test apparatus 98 is connected to Internet 94 via ISP 90, such that PVC 104 is connected to PVC 92, as shown in FIG. 4.

Referring to FIG. 3, when system 50 is operating in subscriber test mode, such that PVC 104 is connected to PVC 76, test apparatus 98 is connected to subscriber site 58 along the path indicated at B, and subscriber site 58 is disconnected from Internet 94. In order to effect subscriber test mode, it is contemplated that test apparatus 98 will be configured to mimic the network connections to Internet 94 offered by ISP 90 to subscriber site 58. In other words, subscriber site 58 will experience an attempt to connect to Internet 94. For example, where connections with ISP 90 from subscriber site 58 are made using Point-to-Point Protocol Over Ethernet ("PPPOE"), and thus ISP 90 will include a remote access server ("RAS") in order to effect PPPOE authentications from subscribers, then test apparatus 98 be configured to mimic such PPPOE authentications that are experienced by subscriber site 58 when system 50 is in the standard mode shown in FIG. 2.

Figure 4:
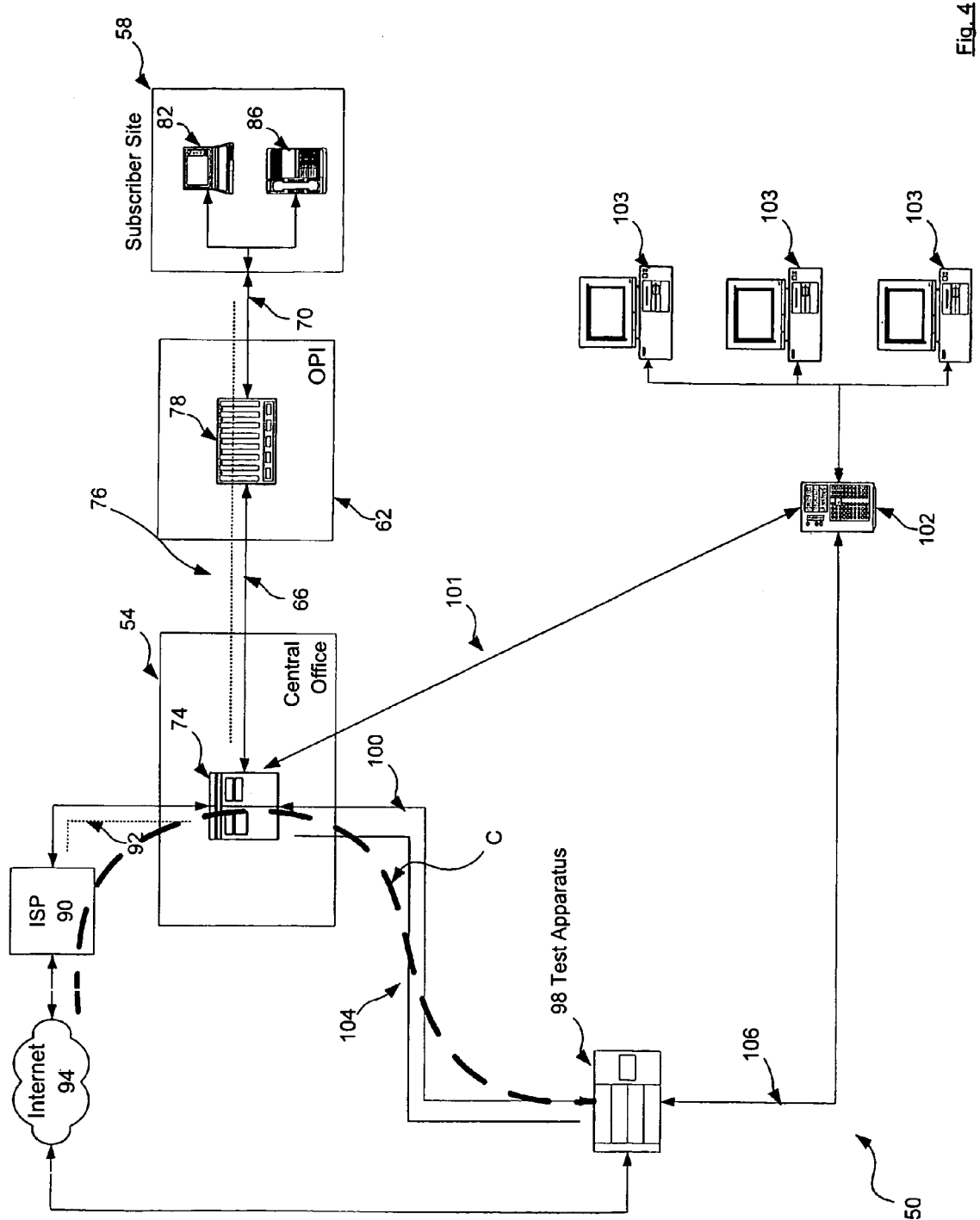
FIG. 4 shows the system of FIG. 1 operating in an Internet test mode.

By the same token, and referring to FIG. 4, when system 50 is operating in Internet test mode, such that PVC 104 is connected to PVC 92, test apparatus 98 is connected to subscriber site 58 along the path indicated at C, and subscriber site 58 is disconnected from. Internet 94. In order to effect Internet test mode, it is contemplated that test apparatus 98 will be configured to mimic subscriber site 58 and, so mimicking subscriber site 58, attempt to connect with Internet 94 via ISP 90. For example, where subscriber site 58 connects with ISP 90 via PPPOE authentication, then when test apparatus 98 attempts to connect with ISP 90, test apparatus 98 will attempt a PPPOE authentication with ISP 90 in substantially the same manner as subscriber site 58 would attempt to do a PPPOE authentication with ISP 90 when system 50 is in the standard mode shown in FIG. 2.

While the present example refers to PPPOE, other connection initiation can be used, such as point to point over ATM, Dynamic Host Configuration Protocol ("DHCP"), etc., as desired, regardless of the type of physical connection used, and according to service levels guaranteed to customers, and customer profiles.

It is contemplated that, in some embodiments, a single test apparatus 98 can be used with a plurality of central offices 54, being dynamically connectable to each central office 54 via a link 100 or other type of network managed by the service provider(s) that own and/or operate central office 54 and test apparatus 98. In this manner, one test apparatus 98 could be used across a large geographic area such as an entire country or continent. Such a link can be based on an asynchronous transfer mode ("ATM"), or Gigabit Ethernet ("GigE") or other type of network internally managed by a service provider. In other embodiments it can be desired to use a plurality of test apparatuses 98 as desired. In a present embodiment, test apparatus 98 also has a direct connection to Internet 94, the details of which will be explained further below. Thus, it is contemplated that test apparatus 98 can be owned and/or operated by one entity, while central office 54 and OPI 62 are owned and operated by a different entity, thereby allowing the entity that owns central office 54 and OPI 62 to outsource the network connection testing functions to the owner/operator of test apparatus 98.

System 50 also includes at least one customer care computing apparatus 102 that connects to test apparatus 98 via a link 106 or other type of network managed by the service provider(s) that own and/or operate test apparatus 98. Computing apparatus 102 is operable to deliver instructions to test apparatus 98, and receive the results of tests performed by test apparatus 98. Computing apparatus 102 also connects to gateway 74 via internal network 101, which can be a GigE or an ATM network, etc., in order to instruct gateway 74 in the connections of PVCs, and therefore determine the operating mode of system 50. The computing apparatus is shown in system 50 is typically connected to a plurality of customer care workstations 103, each operated by customer service representatives, who are able to receive voice calls (or other communications) from subscribers reporting difficulties, and who are able to issue instructions to test apparatuses 98 in order to ascertain the nature of those network connections problems. The owner and/or operator of computing apparatus 102 is typically, though not necessarily, the same as the owner/operator of test apparatus 98. By the same token, computing apparatus 102 can be incorporated directly into test apparatus 98, and thereby obviate the need for link 106 to effect a remote connection, and/or obviate the need for link 101. While presently less preferred, in other embodiments the functionality of computing apparatus 102 and test apparatus 98 and gateway 74 can also be integrated into a single device.

Figure 5:
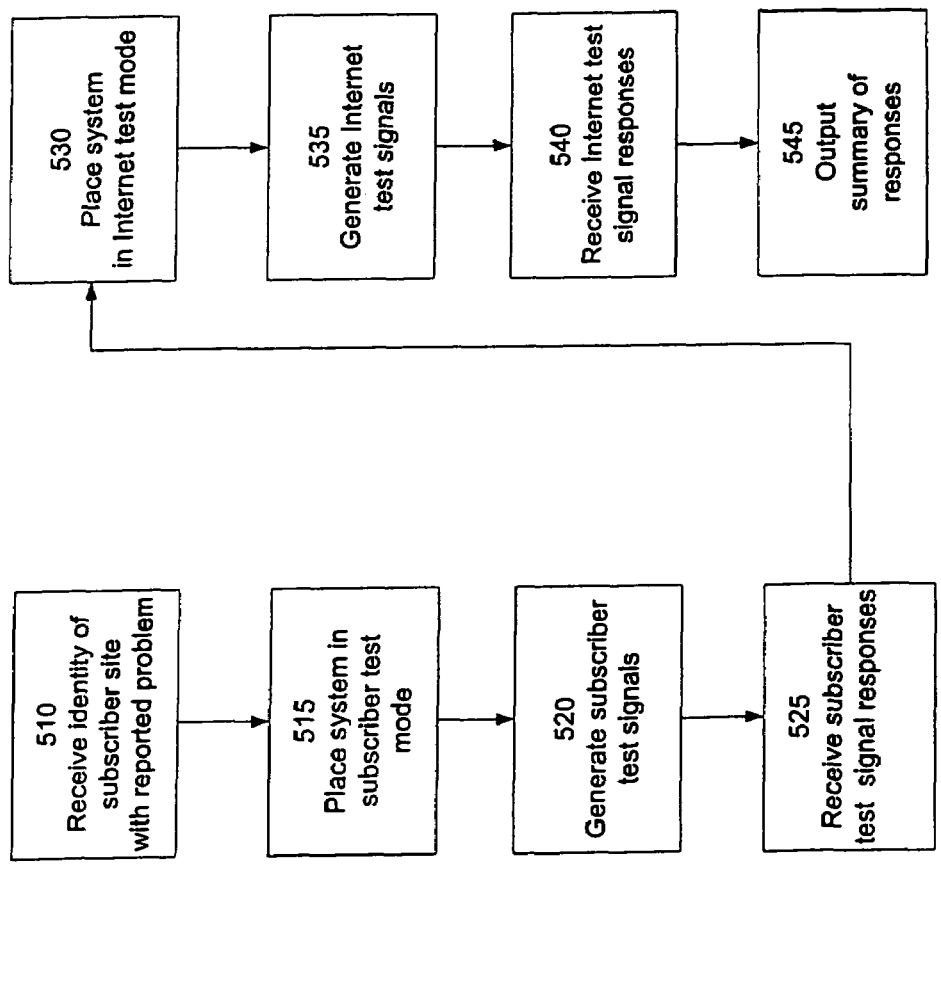
FIG. 5 is a flowchart depicting a method of testing network connections in accordance with another embodiment of the invention; and, FIG. 6 is a schematic representation of a system for testing network connections in accordance with another embodiment of the invention.

Reference will now be made to FIG. 5 which shows a flowchart depicting a method for testing network connections which is indicated generally at 500. In order to assist in the explanation of the method, it will be assumed that method 500 is performed using system 50. However, it is to be understood that system 50 and/or method 500 can be varied, and need not work exactly as discussed herein in conjunction with each other, and that such variations are within the scope of the present invention. Before discussing the method, it will be assumed that a connection at the physical layer between Internet 94 and subscriber site 58 exists, and it will also be assumed that system 50 is operating in standard mode, as shown in FIG. 2, in that there is a connection between Internet 94 and subscriber site 58, but that test apparatus 98 is connected to neither Internet 94 or subscriber site 58 via central office 54.

Beginning first at step 510, the identity of a subscriber site experiencing network connections problems is received. Using system 50 as an example, this step is performed as the user at subscriber site 58 contacts a customer service representative at computing apparatus 102 to report a problem. (While not part of the present embodiment, in the alternative, the customer service representative or other representative of the service provider could start network connections proactively, without having it initiated by the subscriber.) Having received the identity of the subscriber site, method 500 will advance to step 515.

At step 515, the customer service representative operating one of the workstations 103 connected to computing apparatus 102 will issue an instruction to computing apparatus 102, which will issue an instructions to test apparatus 98 and gateway 74 to place the system in the subscriber test mode. Using a graphical user interface ("GUI") or other means of providing input to the workstation 103, the customer service representative will enter in the appropriate instructions, appropriate portions of which are passed to test apparatus 98 and gateway 74 respectively via computing apparatus 102, which in turn causes system 50 to enter into the subscriber test mode shown in FIG. 3.

Next, at step 520, a plurality of subscriber test signals are issued from test apparatus 98 in order to test network connections between test apparatus 98 and subscriber site 58. More particularly, such subscriber tests evaluate network connections between central office 54 and subscriber site 58. The type of test signals is not particularly limited, and can be chosen based on the layer in the protocol stack (e.g. the Open Systems Interconnection ("OSI") Reference Model) being tested, and/or the type of data service at subscriber site 58 that is being affected and/or such other criteria as may be desired. For example, assuming that the data service being affected at subscriber site 58 was web-browsing on computing device 82, then test apparatus 98 can be instructed to issue a plurality of "ping" commands via the Internet Control Message Protocol ("ICMP") to subscriber site 58. Based on the information received back in those "pings", test apparatus 98 can make certain determinations about the network connections between central office 54 and subscriber site 58.

Other types of network connection tests can be performed, such as tests for throughput of Ethernet frames or transport control protocol/internet protocol ("TCP/IP") packets. Again, such tests can be chosen based on any desired characteristics of the type of subscriber device or application or characteristic of the layer in the protocol stack. As another example, where difficulty is being experienced with VOIP calls from telephone device 86, then test apparatus 98 can be used to monitor the quality of outbound VOIP calls from device 86 in order to test for network connections issues.

Next, at step 525, subscriber test signal responses are received. Thus, the results of the tests performed at step 520 are gathered and collected at test apparatus 98.

At step 530, the customer service representative operating one of the workstations 103 connected to computing apparatus 102 will issue instructions to computing apparatus 102, which will issue an instructions to test apparatus 98 via link 106 and to gateway 74 via link 101 to place the system in the Internet test mode. Using a graphical user interface ("GUI") or other means of providing input to the workstation 103, the customer service representative will enter in the appropriate instructions into the workstation for delivery to computing apparatus 102. In turn these instructions are passed to test apparatus 98 and gateway 74, causing system 50 to enter into the Internet test mode shown in FIG. 4.

At step 535, Internet test signals are generated. In a present embodiment, a plurality of subscriber test signals are issued from test apparatus 98 in order to test network connections between test apparatus 98 and Internet 94. More particularly, such Internet tests evaluate network connections between central office 54 and Internet 94 via ISP 90. The type of test signals is not particularly limited, and can be chosen based on the layer in the protocol stack (e.g. the Open Systems Interconnection ("OSI") Reference Model) being tested, and/or the type of data service at subscriber site 58 that is being affected and/or such other criteria as may be desired. For example, assuming that the data service being affected at subscriber site 58 was web-browsing on computing device 82, then test apparatus 98 can be instructed to issue a plurality of "ping" commands via the ICMP to some destination site on Internet 94. Based on the information received back in those "pings", test apparatus 98 can be able to make certain determinations about the network connections between central office 54 and Internet 94. Additionally, using link 107, the direct connection between test apparatus 98 and Internet 94, test apparatus 98 is able to look for a round trip time (i.e. latency) of packets that are sent from test apparatus 98, through central office 54 to Internet 94, and then back to test apparatus 98 via the direct connection between test apparatus 98 and Internet 94. A plurality of other tests can be performed by using both the direct connection between test apparatus 98 and Internet 94 and the connection between test apparatus 98 and Internet 94 that runs via central office 54.

Other types of network connection tests can be performed, such as tests for throughput of Ethernet frames or transport control protocol/internet protocol ("TCP/IP") packets. Again, such tests can be chosen based on any desired characteristics of the type of subscriber device or application or characteristic of the layer in the protocol stack.

Next, at step 540, subscriber test signal responses are received. Thus, the results of the tests performed at step 540 are gathered and collected at test apparatus 98.

At step 545, an output summarizing the responses from steps 525 and 540 is generated. Such a summary is prepared using test apparatus 98 and output to computing apparatus 102 so that the customer service representative at the appropriate workstation can take further corrective action to remedy any network connections issues found in the summary. Such corrective action can include dispatching repair teams to such portions of the pathway between Internet 94 and subscriber premises 58 as are identified as having specific network connections issues.

It should now be understood that method 500 (and system 50) can be modified so that only a subscriber test in subscriber test mode is performed (i.e. by omitting steps 530-540), or so that only an Internet test in the Internet test mode is performed (i.e. by eliminating steps 515-525).

It should now be understood that the types of network connection tests performed at steps 520 and 535 are not particularly limited. In general, any one of plurality of quality of service ("QOS") tests can be performed. Such QOS tests can include, for example, constant bit rate tests, time delay tests, tests involving the introduction of jitter, noise, bad or defective packets, tests involving cyclic redundancy checks, tests involving packet loss using the VOIP SIP protocol, and the like. Such QOS tests can be performed to verify service level agreements that are also based on such QOS tests.

Various ways to implement such QOS tests in test apparatus 98 will now occur to those of skill in the art. For example, in certain embodiments test apparatus 98 can be based on an off-the-shelf test head such as the Spirent Adtech AX4000 from Spirent Communications, 15200 Omega Drive, Rockville, Md. 20850. When so used for test apparatus 98, test apparatus 98 will thus be operable to perform the full range of network connection tests currently available in Spirent Adtech AX4000. In these embodiments the Spirent Adtech AX4000 is modified to be remotely controlled by computing apparatus 102, and thus the Spirent Adtech AX4000 is configured to remotely accept instructions from computing apparatus 102, and to return results thereto. Thus, the tests actually generated by the Spirent Adtech AX4000 will be based on such QOS tests as will provide the desired type of network connection tests.

It is to be understood that the network connection tests used for the subscriber test signals at step 520 can have a level of sophistication corresponding to the hardware and software features of devices 82 and/or 86 at subscriber site 58. When using a prior art digital subscriber line ("DSL") modem at subscriber site 58 to connect to device 82, such network connection tests can be simply based on ICMP "pinging" as previously described. However, where the DSL modem at subscriber site 58 is enhanced to include firmware that allow it to be remotely controlled to activate higher level applications, then more sophisticated tests can be performed. (As used herein, the term higher level applications refers to applications that execute on the levels of the Open Systems Interconnection ("OSI") Reference Model that are higher than those used to delivery ICMP packets) An example of a DSL modem with such enhanced firmware is discussed in applicant's co-pending patent application entitled SUBSCRIBER STATION, bearing patent application number 2,454,408, and filed in the Canadian patent office on Dec. 30, 2003, the contents of which are incorporated herein by reference.

It can also be desired to provide test apparatus 98 with functionality needed to allow a subscriber or other individual at subscriber site 58 to perform their own network connection tests from device 82 or such other devices as may be connected at site 58. Such network connection tests can be used to allow the subscriber to satisfy themselves that network connections actually exist, and that service level agreements with the subscriber are being met—all without the need for a truck roll to subscriber site 58. As a simple example, an individual operating device 82 while system 50 is in subscriber test mode shown in FIG. 2 can enter their own "ping" commands (or the like) into device 82, to "ping" test apparatus 98 and thereby receive basic ping statistics. Where a DSL modem at site 58 includes the above-mentioned enhanced firmware to allow that modem to activate higher level applications during connection to test apparatus 98, then test apparatus 98 can be configured to host a web page that is accessible by a web-browser executing on device 82. In this situation, such a web page hosted at test apparatus 98 can include a number of user friendly features so that the customer at device 82 can interact with such a website and be given demonstrations that network connections exists, and is healthy, between subscriber site 58 and gateway 74. In an embodiment, an individual operating device 82 could initiate system 50 to initiate subscriber test mode by visiting a website hosting a website operated by ISP 90, subject to implementation of appropriate security measures to reduce the likelihood of unauthorized use.

Figure 6:
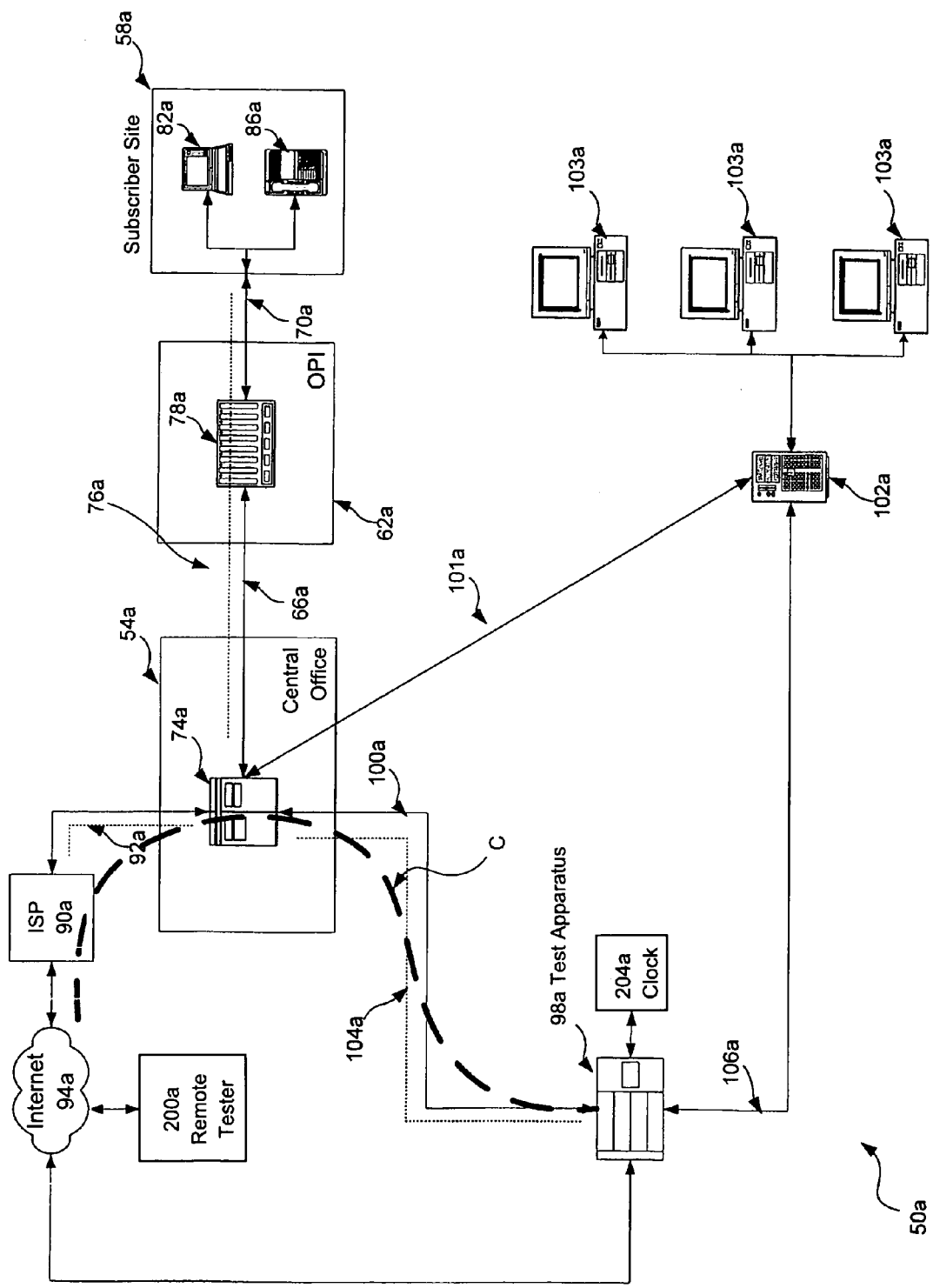

Referring now to FIG. 6 a system in accordance with another embodiment of the invention is indicated generally at 50a. System 50a includes the same components as system 50, and like components in system 50 bear the same reference as their counterparts in system 50, except with the suffix "a". In addition to the components found in system 50, system 50a also includes a remote tester 200a and a local clock 204a attached to test apparatus 98a. System 50a is particularly configured for testing VOIP network connections from gateway 74a out to Internet 94a. Thus, when system 50a is in Internet test mode, test apparatus 98a will be instructed to perform a number of network connection tests to Internet 94a to verify various quality of service ("QOS") parameters that are relevant to VOIP, those tests typically being based on the Session Initiation Protocol ("SIP") including tests for throughput, jitter, delay, etc. and such other tests as will now occur to those of skill in the art.

In addition any other QOS tests that can be desirable to perform, test apparatus 98a is also operable perform a delay test to determine any delay in a VOIP call made from test apparatus 98a to Internet 94a. Thus, local clock 204a will include a clock, such as a clock based on a global positioning system ("GPS") device for high accuracy, and thus the time of origination of packets from an outbound simulated VOIP call from test apparatus 98a to Internet 94a will be recorded based on time stamp information gathered from GPS satellites. Such an outbound simulated VOIP call will be destined for remote tester 200a that is located at a remote location on Internet 94a. Remote tester 200a will thus also include a GPS device, so that the exact time of arrival of those simulated VOIP packets sent from tester 98a can be recorded. The information about when those simulated VOIP packets arrived at remote tester 200a can then be sent back to tester 98a via the direct connection between Internet 94a and tester 98a. A comparison can then be made between the time of origination of the VOIP packets from tester 98a, and the time of arrival of those VOIP packets at remote tester 200a. Such a comparison can reveal if there are any unexpected or undesirable delays along pathway C, and thereby allow test apparatus 98a to report these back to computing apparatus 102a, and in turn to the appropriate workstation, so that corrective action can be taken. It should now be understood that, in other embodiments, other types of high accuracy clocks can also be used other than a clock based on GPS.

Figure 7:
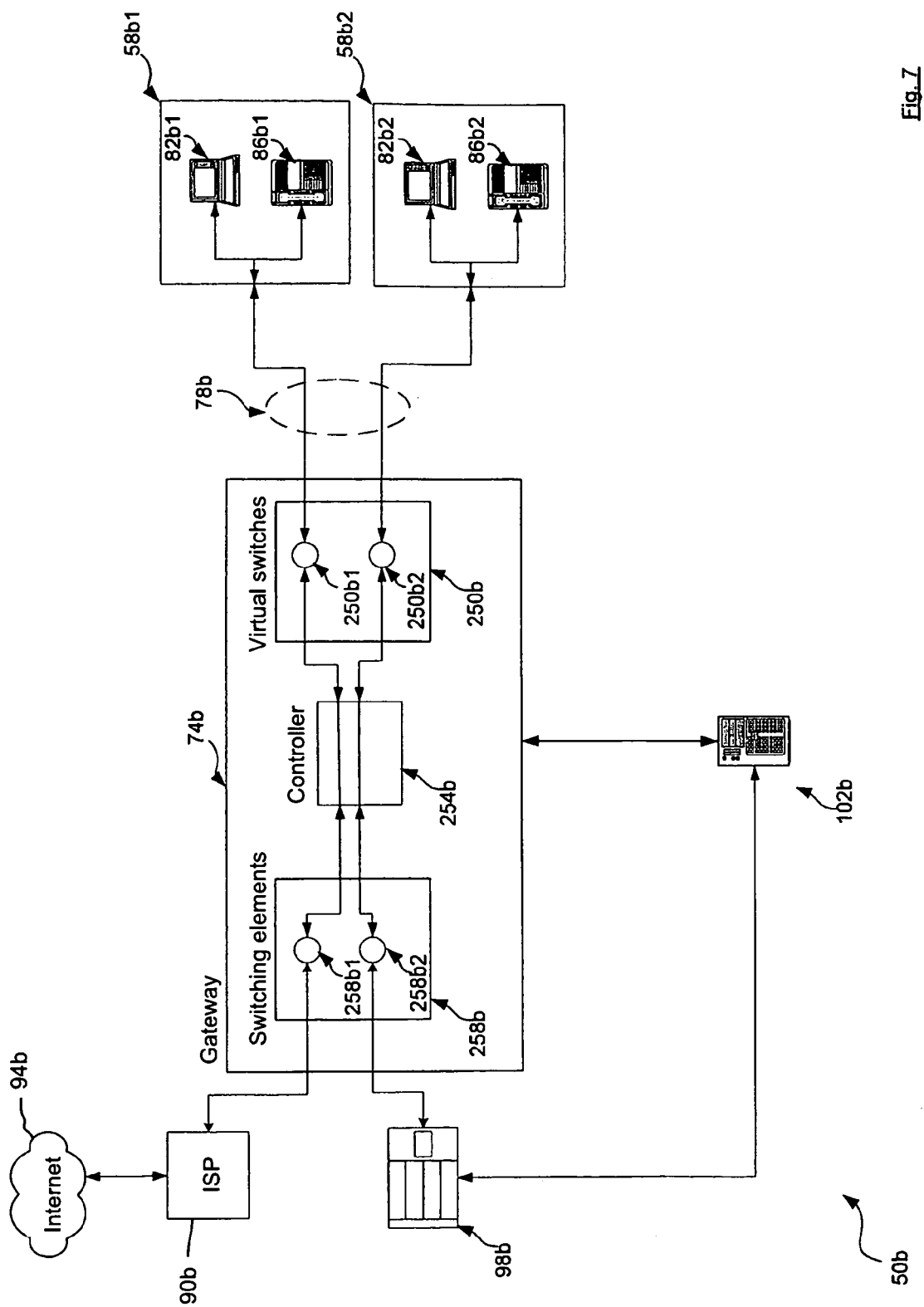
FIG. 7 is a schematic representation of a system for testing network connections in accordance with another embodiment of the invention.

As previously mentioned, gateway 74 (or gateway 74a) can be implemented using a Stinger® that includes a plurality of permanent virtual circuits ("PVC") which allow remote switching of various subscriber stations to ISPs and/or test apparatuses, in accordance with the various modes shown in FIGS. 2, 3 and 4. Thus, while a Stinger® is used in gateway 74, it is to be understood that any type of means to effect switching between subscriber stations, ISPs and test apparatuses can be used. A general representation of such means for switching is shown as system 50b in FIG. 7, wherein like elements in system 50b to like elements in system 50 bear the same reference number but are followed by the suffix "b". System 50b can thus be implemented using a Stinger® for gateway 74b or any other type of technology to provide substantially similar means for switching. In FIG. 7, system 50b includes a plurality of subscriber sites 58b1 and 58b2 (and could include additional subscriber sites beyond the two shown in FIG. 7). In system 50b, gateway 74b includes a controller 254b that moderates communications between ISP 90b or test apparatus 98b, and subscriber sites 58b1 and 58b2, according to the positioning of the means for switching within gateway 74b. System 50b includes a first set of virtual switches 250b that connect controller 254b to each subscriber site 58b1 and 58b2. First set of virtual switches 250b includes a first switching element 250b1 that connects controller 254b to subscriber site 58b1, and a second switching element 250b2 that connects controller 254b to subscriber site 58b2. Each switching element 250b1 and 250b2 can thus be remotely controlled by computing apparatus 102b in order to assign a particular switching element to a particular subscriber site. According to the orientation of the switch element, a virtual circuit is created between the controller and the subscriber site.

By the same token, system 50b also includes a second set of switching elements 258b that connect controller 254b (and in turn a particular subscriber site) to either ISP 90b or to test apparatus 98b. In the example shown in FIG. 7, subscriber site 58b1 is shown connected to ISP 90b while subscriber site 58b2 is shown connected to controller 254b. Thus, in FIG. 7, subscriber site 58b1 is shown in the "standard mode", while subscriber site 58b2 is shown in the "subscriber test mode". In general, such switching elements render gateway 74b operable to allow a subscriber site 58b1 or 58b2 to connect either to ISP 90b or to test apparatus 98b, all via remote instruction to gateway 74b from computing apparatus 102b. It will now be apparent that gateway 74b can be implemented via Stinger® or other means, as desired.

Figure 8:
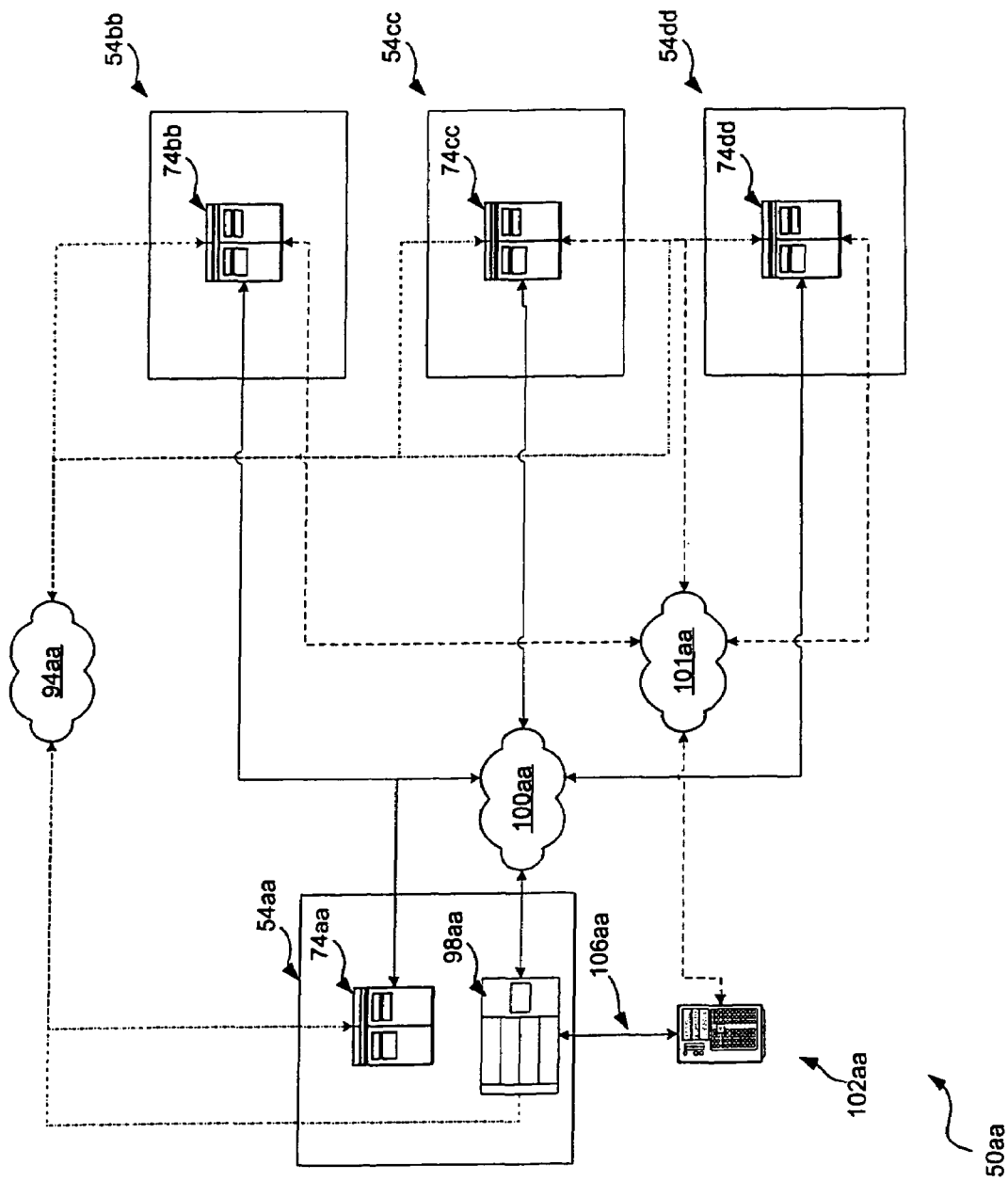
FIG. 8 is a schematic representation of a system for testing network connections in accordance with another embodiment of the invention; and, FIG. 9 shows certain components of the system of FIG. 8 in greater detail.

Variations on and/or combinations of the configurations in system 50, system 50a and system 50b are within the scope of the invention. For example, it is to be understood that a test apparatus, such as test apparatus 98, can be located in any location in relation to the one or more central offices that are served by that test apparatus. By the same token, a single test apparatus can actually be situated in one central office, where that central office is connected to a plurality of different central offices to be serviced by that test apparatus. Such an exemplary configuration is shown as system 50aa in FIG. 8, wherein like elements in system 50aa to like elements in system 50 bear the same reference number but are followed by a double-letter suffix of the format "xx". System 50aa thus includes a single test apparatus 98aa that is situated in one central office 54aa and sitting adjacent to one gateway 74aa, but the same test apparatus 98aa is also connected to a plurality of other gateways 74bb, 74cc, 74dd located in other central offices 54bb, 54cc, 54dd respective thereto. (While not shown in system 50aa in order to simplify the presentation of FIG. 8, it is to be understood that gateways 74aa, 74bb, 74cc, and 74dd each serve a plurality of different OPIs 62, which in turn serve a plurality of different subscriber premises 58 as previously described.) It should now be understood that in this configuration, each central office 54aa, 54bb, 54cc, 54dd can be owned and/or operated by one or more different carriers. For example, where central offices 54bb, 54cc, and 54dd are owned and operated by a first carrier while central office 54aa is owned and operated by a second carrier, then the second carrier can enter into a service contract with the first carrier whereby the second carrier performs the connection testing as described herein on behalf of the first carrier. As an alternative, a test apparatus 98 can be situated in each central office 54. Still further alternative configurations will now occur to those of skill in the art.

It should now be understood that test apparatus 98aa in system 50aa includes both tester functionality and switching functionality. This is represented in a simplified format in FIG. 9, wherein test apparatus 98aa is shown including a test head 300aa, and a switch 304aa. In FIG. 9, switch 304aa is shown as connecting test head 300aa to gateway 74aa. The switch 304aa is thus operable to connect test head 300aa to any of gateways 74aa, 74bb, 74cc and 74dd. Switch 304aa can be accomplished using any hardware and/or software techniques known in the art—such as by utilizing PVCs that are part of the inherent functionality of known gateways 74, as previously described. It should also be understood that, where tester 300aa is operable to test multiple subscriber premises simultaneously, then switch 304aa can be operable to simultaneously connect tester 300aa to multiple corresponding gateways 74. It is to be further understood that the number of gateways 74 to which test head 300aa can simultaneously connect is not particularly limited, and that switch 304aa can be modified to thus connect is not limited. In a presently preferred embodiment of a test head 300a, the test head 300a has twenty ports to which various gateways 74 can simultaneously connect via switch 304aa.

While only specific combinations of the various features and components of the present invention have been discussed herein, it will be apparent to those of skill in the art that desired subsets of the disclosed features and/or components and/or alternative combinations of these embodiments, and the features and components thereof, can be utilized, as desired. For example, the teachings herein can be combined with the teachings found in the applicant's co-pending patent application entitled METHOD AND SYSTEM FOR CONNECTION VERIFICATION, bearing patent application Ser. No. 10/670,261, and filed in the United States Patent Office on Sep. 26, 2003, the contents of which are incorporated herein by reference.

It is to be understood that links 100, 101, 106 and 107 in system 50 (and its variants in system 50a and system 50aa) are represented as being separate physical links in order to simplify their explanation, but it is to be understood that other means of effecting those links, either physically or virtually, are within the scope of the invention.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A test apparatus for testing network connections comprising:
   a first interface for connecting to a node situated along a pathway between a data network and a subscriber device;
   a second interface for connecting to a computing apparatus; and,
   a test head intermediate said interfaces and operable to generate at least one network connection test over at least a portion of said pathway, said test head further operable to generate said at least one connection test based on instruction received from said computing apparatus via said second interface, said test head further operable to generate output representing results of said at least one network connection test, wherein said test head connects to said node based on an additional instruction from said computing apparatus received at at least one of said test head and said node; said additional instruction for disconnecting said subscriber device from said node such that said at least a portion of said pathway is between said node and said data network.

2. The test apparatus of claim 1 wherein said first interface includes a switch operable to remotely connect said first interface to at least one of a plurality of nodes.

3. The test apparatus of claim 2 wherein said switch is operable to connect said first interface to a plurality of said nodes substantially simultaneously and wherein said test head is operable to generate a connection test for each pathway respective to each said node such that said test apparatus is operable to perform a plurality of said connection tests substantially simultaneously.

4. The test apparatus of claim 1 wherein said at least one network connection test includes at least one of an ICMP "ping", a test for constant bit rate, a test for time delay, a test including the introduction of jitter, noise, bad or defective packets, a cyclic redundancy check, and a test including packet loss.

5. A test apparatus testing network connections comprising:
a first interface for connecting to a node situated along a pathway between a data network and a subscriber device;
a second interface for connecting to a computing apparatus; and,
a test head intermediate said interfaces and operable to generate at least one network connection test over at least a portion of said pathway, said test head further operable to generate said at least one connection test based on instruction received from said computing apparatus via said second interface, said test head further operable to generate output representing results of said at least one network connection test,
wherein said test head connects to said node based on an additional instruction from said computing apparatus received at at least one of said test head and said node; said additional instruction for disconnecting said network from said node such that said at least a portion of said pathway is between said node and said subscriber device.

6. The test apparatus of claim 1 wherein said test apparatus further includes a local clock resident at said test apparatus for communicating with a remote tester resident on said network, said remote tester including another clock, said at least one network connection test including a test for delay wherein at least one VOIP packet is sent from said test apparatus to said remote tester at an originating time according said local clock, and said remote tester returns an arrival time according to said another clock when said at least one VOIP packet arrived at said remote tester such that a comparison can be effected between said times.

7. The test apparatus of claim 6 wherein said local clock is based on a GPS clock.

8. The test apparatus of claim 1 wherein said test head is at a remote location from said computing apparatus.

9. The test apparatus of claim 8 wherein communications with said computing apparatus via said second interface are conducted over a proprietary secure network of a service provider operating said computing apparatus.

10. The test apparatus of claim 5 wherein said at least one network connection test includes at least one of an ICMP "ping", a test for constant bit rate, a test for time delay, a test including the introduction of jitter, noise, bad or defective packets, a cyclic redundancy check and a test including packet loss.

11. The test apparatus of claim 5 wherein said first interface includes a switch operable to remotely connect said first interface to at least one of a plurality of nodes and wherein said instruction includes a command to actuate said switch.

12. The test apparatus of claim 5 wherein said network connection test is initiated by user input entered into a web page presented on said subscriber device and for issuing instructions to said test head.

13. The test of apparatus of claim 1 wherein said output is delivered to said computing apparatus via said second interface.

14. A test apparatus for testing network connections comprising:
a first interface for connecting to a node situated along a pathway between the Internet and a subscriber device;
a second interface for connecting to a remote computing apparatus; and,
a test head between said interfaces and operable to generate at least one network connection test over at least a portion of said pathway, said test head further operable to generate said at least one connection test based on instructions received from said computing apparatus via said second interface, said test head further operable to return results of said at least one network connection test to said computing apparatus via said second interface,
wherein said test head connects to said node based on an additional instruction from said computing apparatus received at at least one of said test head and said node; said additional instruction for disconnecting said subscriber device from said node such that said at least a portion of said pathway is between said node and said data network.

15. The test apparatus according to claim 14 wherein said node is a DSLAM for intermediating communications between said Internet and said device and wherein said pathway based on DSL.

16. A test apparatus for testing network connections comprising:
a first interface for connecting to a node situated along a pathway between the Internet and a subscriber device;
a second interface for connecting to a remote computing apparatus; and,
a test head between said interfaces and operable to generate at least one network connection test over at least a portion of said pathway, said test head further operable to generate said at least one connection test based on instructions received from said computing apparatus via said second interface, said test head further operable to return results of said at least one network connection test to said computing apparatus via said second interface,
wherein said test head connects to said node based on an additional instruction from said computing apparatus received at at least one of said test head and said node; said additional instruction for disconnecting said network from said node such that said at least a portion of said pathway is between said node and said subscriber device.

17. The test apparatus of claim 14 wherein communications with said computing apparatus via said second interface are conducted over at least a portion of a secure network proprietary to a service provider operating said computing apparatus.

18. The test apparatus of claim 14 wherein said first interface includes a switch operable to remotely connect said first interface to at least one of a plurality of nodes and wherein said instruction includes a command to actuate said switch.

19. The test apparatus of claim 16 wherein said network connection test is initiated by user input entered into a web page presented on said subscriber device and for issuing instructions to said test head.

20. A computing apparatus comprising an interface for remote connection to a test apparatus, said apparatus operable to cause introduction of said test apparatus to a node situated along a pathway between a data network and a subscriber device, said computing apparatus further operable to remotely instruct said test apparatus to perform at least one network connection test over at least a portion of said pathway, said computing, apparatus further operable to receive results of said at least one network connection test that are generated by said test apparatus,
wherein said introduction includes an instruction to disconnect said subscriber device from said node such that said portion of said pathway comprises a path between said node and said data network.

21. The computing apparatus of claim 20, wherein said node is a gateway having at least one PVC and said instruction is addressed to said PVC.

22. A computing apparatus comprising an interface for remote connection to a test apparatus, said apparatus operable to cause introduction of said test apparatus to a node situated along a pathway between a data network and a subscriber device, said computing apparatus further operable to remotely instruct said test apparatus to perform at least one network connection test over at least a portion of said pathway, said computing apparatus further operable to receive results of said at least one network connection test that are generated by said test apparatus,
wherein said introduction includes an instruction to disconnect said data network from said node such that said portion of said pathway comprises a path between said node and said subscriber device.

23. The computing apparatus of claim 22 wherein said node is a gateway having at least one PVC and said instruction is addressed to said PVC.

24. The computing apparatus of claim 20 wherein said computing apparatus is implemented in a distributed manner across a first computing device that is remote from a second computing device.

25. The computing apparatus of claim 20 wherein said pathway is based on DSL and said connection test based on DSL standards.

26. The computing apparatus of claim 20 wherein said at least one network connection test includes at least one of an ICMP "ping", a test for constant bit rate, a test for time delay, a test including the introduction of jitter, noise, bad or defective packets, a cyclic redundancy check, and a test including packet loss.

27. The computing apparatus of claim 20 wherein said apparatus is accessible to a plurality of customer service workstations from which said apparatus can be operated.

28. The computing apparatus of claim 20 wherein said test apparatus is at a remote location from said computing apparatus.

29. The computing apparatus of claim 20 wherein communications with said test apparatus are conducted over at least a portion of a secure network proprietary to a service provider operating said computing apparatus.

30. A system for testing network connections comprising:
a node for connection to a data network;
a subscriber device connected to said node and for communicating with said data network via said node;
a test apparatus remotely connectable to said node and for performing at least one network connection test along at least a portion of a pathway between said node and said data network or said node and said subscriber device; and,
a computing apparatus connected to said test apparatus and said node for instructing said test apparatus to perform said test and for receiving results thereof from said test apparatus,
wherein said test apparatus is connectable to said node via a command from said computing apparatus, said command including an instruction to said node to disconnect said subscriber device from said node such that said portion of said pathway comprises ,a path between said node and said data network.

31. The system of claim 30 wherein said network connection test is initiated by user input entered into a web page presented on said subscriber device and for issuing instructions to said, test head.

32. The system of claim 30 wherein said test apparatus is at a remote location from said computing apparatus.

33. The system of claim 30 wherein communications between said computing apparatus and said test apparatus are conducted over at least a portion of a secure network proprietary to a service provider operating said computing apparatus.

34. The system of claim 30 wherein said test apparatus includes a switch operable to remotely connect said first interface to at least one of a plurality of nodes and wherein said instructing includes a command to actuate said switch.

35. The system of claim 30 wherein said node is a gateway having at least one PVC and said instruction is addressed to said PVC.

36. A system for testing network connections comprising:
a node for connection to a data network;
a subscriber device connected to said node and for communicating with said data network via said node;
a test apparatus remotely connectable to said node and for performing at least one network connection test alone at least a portion of a pathway between said node and said data network or said node and said subscriber device; and,
a computing apparatus connected to said test apparatus and said node for instructing said test apparatus to perform said test and for receiving results thereof from said test apparatus,
wherein said test apparatus is connectable to said node via a command from said computing apparatus, said command including an instruction to disconnect said data network from said node such that said portion of said pathway comprises a path between said node and said subscriber device.

37. The system of claim 36 wherein said node is a gateway having at least one PVC and said instruction is addressed to said PVC.

38. The system of claim 30 wherein test apparatus and said computing apparatus are integrated into a single apparatus.

39. The system of claim 30 further comprising a plurality of workstations connected to said computing apparatus for issuing instructions thereto.

40. The system of claim 30 wherein said node is a gateway for intermediating communications between said network and said subscriber device.

41. The system of claim 40 wherein said gateway is a DSL access concentrator and further comprising an outside plant interface intermediate said node and said subscriber device, said outside plant interface housing a DSLAM for intermediating communications between said DSL access concentrator and said subscriber device.

42. The system of claim 40 wherein said gateway includes a plurality of permanent virtual circuits that are switchable according to instructions received from said computing apparatus,
   wherein a connection between said gateway and said data network is effected via a first permanent virtual circuit at said gateway,
   wherein a connection between said gateway and said subscriber device is effected via a second permanent virtual circuit at said gateway,
   wherein said communications between said subscriber device and said network are effected when said first permanent virtual circuit is connected to said second permanent virtual circuit, and
   wherein introduction of said test apparatus to said gateway includes an instruction from said computing apparatus to disconnect said first permanent virtual circuit from said second permanent virtual circuit and to connect said first permanent virtual circuit with a permanent virtual circuit at said gateway that is connected to said test apparatus.

43. The system of claim 30 wherein said at least one network connection test include at least one of an ICMP "ping", a test for constant bit rate, a test for time delay, a test including the introduction of jitter, noise, bad or defective packets, a cyclic redundancy check, and a test including packet loss.

44. The system of claim 36 wherein said at least one network connection test include at least one of an ICMP "ping", a test for constant bit rate, a test for time delay, a test including the introduction of jitter, noise, bad or defective packets, a cyclic redundancy check, and a test including packet loss.

45. The system of claim 30 wherein said system further includes a local clock resident at said test apparatus and a remote tester resident on said network, said remote tester including another clock, said at least one network connection test including a test for delay wherein at least one VOW packet is sent from said test apparatus to said remote tester at an originating time according said local clock, and said remote tester returns an arrival time according to said another clock when said at least one VOW packet arrived at said remote tester such that a comparison can be effected between said times.

46. The system of claim 45 wherein said clocks are based on GPS devices.

47. The system of claim 36 wherein said test apparatus is further operable to respond to at least one additional network connection test generated by said subscriber device and report the results of said at least one additional network connection test back to said subscriber device.

48. The system of claim 47 wherein said network connection test is initiated by user input entered into a web page presented on said subscriber device and for issuing instructions to said test head.

49. A method for testing a network connection comprising the steps of:
   receiving a remote instruction to perform at least one network connection test over at least a portion of a pathway between a data network and a subscriber device having a node therebetween;
   based on said instruction, generating said at least one network connection test over said at least a portion of said pathway; and,
   outputting results of said at least one network connection test
   wherein said instruction includes disconnecting said subscriber device from said node such that said portion of said pathway comprises a oath between said node and said data network.

50. The method of claim 49 wherein said node is a gateway for intermediating communications between said network and said subscriber device.

51. The method of claim 50 wherein said pathway is based on DSL and
   wherein said gateway is a DSL access concentrator and
   wherein said pathway further comprises an outside plant interface intermediate said node and said subscriber device, said outside plant interface housing a DSLAM for intermediating communications between said DSL access concentrator and said subscriber device.

52. The method of claim 49 wherein said at least one network connection test includes at least one of an ICMP "ping", a test for constant bit rate, a test for time delay, a test including the introduction of jitter, noise, bad or defective packets, a cyclic redundancy check, and a test including packet loss.

53. A method for testing a connection comprising the steps of:
   issuing a first instruction to cause introduction of a test apparatus to a node situated along a pathway between a data network and a subscriber device;
   issuing a second instruction to said test apparatus to perform at least one network connection test over at least a portion of said pathway; and,
   receiving results of said at least one network connection test that are generated by said test apparatus,
   wherein said first instruction includes disconnecting said subscriber device from said node such that said portion of said pathway comprises a path between said node and said data network.

54. A method for testing a connection comprising the steps of:
   issuing a first instruction to cause introduction of a test apparatus to a node situated along a pathway between a data network and a subscriber device;
   issuing a second instruction to said test apparatus to perform at least one network connection test over at least a portion of said pathway; and
   receiving results of said at least one network connection test that are generated by said test apparatus,
   wherein said first instruction includes an instruction to disconnect said data network from said node such that said portion of said pathway comprises a path between said node and said subscriber device.

55. The test apparatus of claim 5 wherein said test head is at a remote location from said computing apparatus.

56. The test apparatus of claim 55 wherein communications with said computing apparatus via said second interface are conducted over a proprietary secure network of a service provider operating said computing apparatus.

57. The test of apparatus of claim 5 wherein said output is delivered to said computing apparatus via said second interface.

58. The test apparatus according to claim 16 wherein said node is a DSLAM for intermediating communications between said Internet and said device and wherein said pathway based on DSL.

59. The test apparatus of claim 16 wherein communications with said computing apparatus via said second interface are conducted over at least a portion of a secure network proprietary to a service provider operating said computing apparatus.

60. The test apparatus of claim 16 wherein said first interface includes a switch operable to remotely connect said first interface to at least one of a plurality of nodes and wherein said instruction includes a command to actuate said switch.

61. The computing apparatus of claim 22 wherein said computing apparatus is implemented in a distributed manner across a first computing device that is remote from a second computing device.

62. The computing apparatus of claim 22 wherein said pathway is based on DSL and said connection test based on DSL standards.

63. The computing apparatus of claim 22 wherein said at least one network connection test includes at least one of an ICMP "ping", a test for constant bit rate, a test for time delay, a test including the introduction of jitter, noise, bad or defective packets, a cyclic redundancy check, and a test including packet loss.

64. The computing apparatus of claim 22 wherein said apparatus is accessible to a plurality of customer service workstations from which said apparatus can be operated.

65. The computing apparatus of claim 22 wherein said test apparatus is at a remote location from said computing apparatus.

66. The computing apparatus of claim 22 wherein communications with said test apparatus are conducted over at least a portion of a secure network proprietary to a service provider operating said computing apparatus.

67. The system of claim 36 wherein said network connection test is initiated by user input entered into a web page presented on said subscriber device and for issuing instructions to said test head.

68. The system of claim 36 wherein said test apparatus is at a remote location from said computing apparatus.

69. The system of claim 36 wherein communications between said computing apparatus and said test apparatus are conducted over at least a portion of a secure network proprietary to a service provider operating said computing apparatus.

70. The system of claim 36 wherein said test apparatus includes a switch operable to remotely connect said first interface to at least one of a plurality of nodes and wherein said instructing includes a command to actuate said switch.

71. The system of claim 36 wherein test apparatus and said computing apparatus are integrated into a single apparatus.

72. The system of claim 36 further comprising a plurality of workstations connected to said computing apparatus for issuing instructions thereto.

73. The system of claim 36 wherein said node is a gateway for intermediating communications between said network and said subscriber device.

74. The system of claim 36 wherein said gateway is a DSL access concentrator and further comprising an outside plant interface intermediate said node and said subscriber device, said outside plant interface housing a DSLAM for intermediating communications between said DSL access concentrator and said subscriber device.

75. The system of claim 74 wherein said gateway includes a plurality of permanent virtual circuits that are switchable according to instructions received from said computing apparatus,
  wherein a connection between said gateway and said data network is effected via a first permanent virtual circuit at said gateway,
  wherein a connection between said gateway and said subscriber device is effected via a second permanent virtual circuit at said gateway,
  wherein said communications between said subscriber device and said network are effected when said first permanent virtual circuit is connected to said second permanent virtual circuit, and
  wherein introduction of said test apparatus to said gateway includes an instruction from said computing apparatus to disconnect said first permanent virtual circuit from said second permanent virtual circuit and to connect said second permanent virtual circuit with a permanent virtual circuit at said gateway that is connected to said test apparatus.

76. A method for testing a network connection comprising the steps of:
  receiving a remote instruction to perform at least one network connection test over at least a portion of a pathway between a data network and a subscriber device having a node therebetween;
  based on said instruction, generating said at least one network connection test over said at least a portion of said pathway; and,
  outputting results of said at least one network connection test
  wherein said instruction includes disconnecting said data network from said node such that said portion of said pathway comprises a path between said node and said subscriber device.

77. The method of claim 76 wherein said node is a gateway for intermediating communications between said network and said subscriber device.

78. The method of claim 77 wherein said pathway is based on DSL and
  wherein said gateway is a DSL access concentrator and
  wherein said pathway further comprises an outside plant interface intermediate said node and said subscriber device, said outside plant interface housing a DSLAM for intermediating communications between said DSL access concentrator and said subscriber device.

79. The method of claim 76 wherein said at least one network connection test includes at least one of an ICMP "ping", a test for constant bit rate, a test for time delay, a test including the introduction of jitter, noise, bad or defective packets, a cyclic redundancy check, and a test including packet loss.

* * * * *

UNITED STATES PATENT AND TRADEMARK OFFICE
CERTIFICATE OF CORRECTION

| | | |
|---|---|---|
| PATENT NO. | : 7,502,327 B2 | Page 1 of 1 |
| APPLICATION NO. | : 11/002122 | |
| DATED | : March 10, 2009 | |
| INVENTOR(S) | : Burns et al. | |

It is certified that error appears in the above-identified patent and that said Letters Patent is hereby corrected as shown below:

Column 17, line 26: replace "apparatus testing" with --apparatus for testing--.

Column 20, line 45: replace "alone" with --along--.

Column 21, line 45: replace "VOW" with --VOIP--.

Column 21, line 49: replace "VOW" with --VOIP--.

Column 22, line 12: replace "oath" with --path--.

Signed and Sealed this

Fourteenth Day of April, 2009

JOHN DOLL
*Acting Director of the United States Patent and Trademark Office*